UNITED STATES PATENT OFFICE.

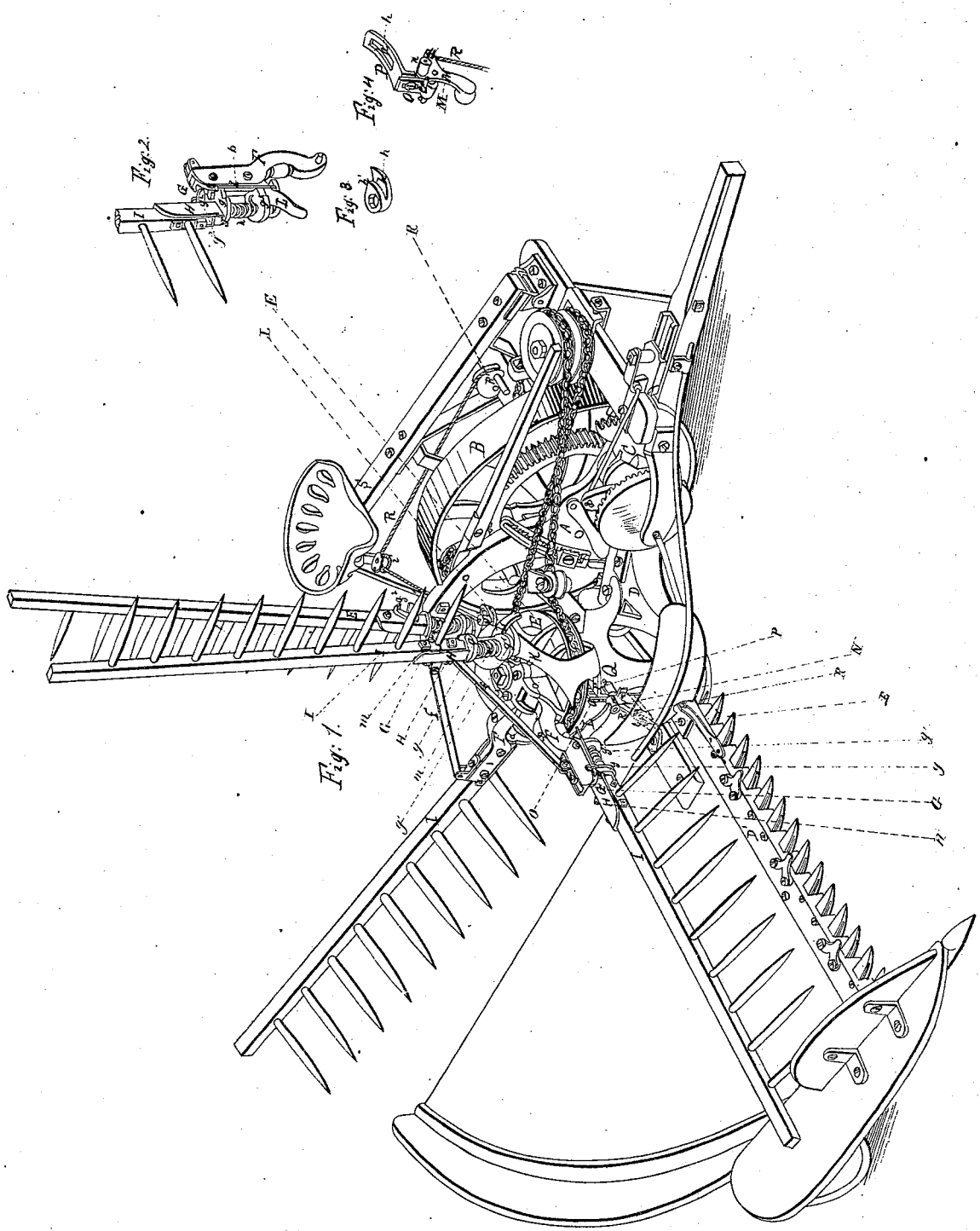

CYRENUS WHEELER, JR., OF AUBURN, NEW YORK.

Letters Patent No. 85,044, dated December 15, 1868.

IMPROVEMENT IN HARVESTER-RAKES.

The Schedule referred to in these Letters Patent and making part of the same.

*To all whom it may concern:*

Be it known that I, CYRENUS WHEELER, Jr., of Auburn, county of Cayuga, and State of New York, have invented certain new and useful Improvements in Harvesting-Machines, of which the following is a full, clear, and exact description, reference being had to the accompanying drawing, making a part of the same, in which—

Figure 1 is a perspective view of a harvesting-machine embracing my improvements;

Figure 2 is a similar view of one of the rake-arms, detached, showing the manner of applying the rake-head thereto;

Figure 3 represents the eccentric rake-latch; and

Figure 4, the tripping-device detached.

Similar letters of reference denote corresponding parts wherever used.

My invention relates to the improvement of the revolving rake and the devices for controlling its action.

Its nature and object will be best understood from the following description.

The construction of a machine to which, in the drawings, my improvements are represented as applied, has been described in former applications, the same consisting of a main frame, A, to which is connected the drive-wheel B, a tongue-frame, C, and cutter-frame, D, which frames are made adjustable relatively to each other, to adapt the cutting-apparatus to follow the surface of the ground over which it is drawn in mowing, and to be adjusted to the desired height for reaping.

It will be apparent, however, that the improvements hereinafter set forth may be applied to any of the various constructions of machines in use, and a further or detailed description of such machine is therefore unnecessary here.

The class of rake-attachment on which my improvements are based, is the one known as a "combined rake and reel," the several arms or rakes and beaters of which revolve continuously about a common vertical or nearly vertical axis.

E represents the rotating head, to which the rake-arms F are pivoted, said arms being connected together in pairs by means of adjustable links $ff$.

To such arms as it is desired to use a rake-head upon, I attach rigidly, by bolts or set-screw, an angular plate, G, armed with projecting perforated ears $g$ $g^1$, which form bearings for the metallic shank or axis H, to which the rake-head I is secured, and with or upon which said head turns on its longitudinal axis, as hereinafter set forth.

Shank H is provided at its outer end with a box or socket to receive the rake-head, arranged in line with the shank, in such manner as that, as the rake-teeth are turned from a vertical to a horizontal position, or *vice versa*, the rake-head itself, or the shank-extension H, in line therewith, shall constitute the centre of movement of the teeth.

J is an adjustable friction-roller, mounted on a flange or lug on the inclined cam-track K, in suitable position to act upon an eccentric heel-plate, $h$, attached to the shank H for the purpose of rotating the rake-head and shank H, to bring the rake-teeth into proper position to act upon the grain.

The heel-plate or cam $h$ is provided with a shoulder, $h'$, with which a latch-lever, L, pivoted to the rake-arm or to plate G, engages for holding the rake-head in position after the plate $h$ has passed and been acted upon by the roller J.

A spring, $l$, serves to retain the latch-lever L in position to engage with the shoulder $h$, when the latter is brought into the required relation to said lever.

The shank H is provided with a spring, $m$, for retracting the shank and rake-head, and causing the rake-teeth to assume a horizontal position for passing over the grain on the platform, when released from the retaining latch L.

A spur, $j$, on the metallic shank H, acting against a shoulder on angular plate G, serves to limit the movement of the rake-head when acted upon by spring $m$.

N is a weighted tripper for releasing the latch-lever L, pivoted in a slotted pendant, O, attached to and made vertically adjustable upon an angular plate, P, the horizontal arm of which is curved in the arc of a circle, the centre of which is in the vertical rake-shaft or of its supporting-standard, Q.

Said plate, P, is slotted, as shown at $p$, and is secured to the base-plate of cam K, or to a flange on the rake-standard, by means of a set-screw or equivalent device, which will permit its adjustment around said standard or rake-shaft, as a centre, and in the path travelled by the latch-levers.

By this construction, the position of the friction-roller $n$, on the weighted tripper N, may be adjusted as desired for regulating the point at which said roller acts upon said latch-levers.

A pin or lug, $o$, on pendant O, serves to hold the tripping-lever N in proper position to act upon the latch-lever.

The tripper, instead of being weighted, as shown, may be acted upon by a spring of any suitable construction for holding it in position against pin or stop $o$.

R is a cord attached to an arm of the tripper N, which passes underneath a pulley or sheave, $r$, at the inner end of the platform or finger-beam, and then, around a second pulley, $r'$, attached to the seat-support S, to a treadle-lever, R', arranged in convenient position to be acted upon by the driver in his seat for operating the tripping-lever N, for the purpose of removing the same out of the path of the latch-lever L, when desired.

The rake-heads are provided with buttons or eccentrics $g^2$, secured thereto by one of the bolts which fasten the rake-head to the metallic shank, said buttons serving, when turned into position shown in fig. 2, to engage with angle-iron G, in which the rake-head is mounted, in such manner as to lock the rake-head, when desired, and prevent it from rocking or rolling on its longitudinal axis when released from the latch-lever.

By this arrangement a bundle is made each time the rake thus locked passes over the platform, without attention from the driver.

From the foregoing description of the construction, the adjustments necessary for the following operations will be readily understood.

For delivering the grain in a swath, all that is required is to set the machine so that all the rakes will roll up at the proper point. The driver, by keeping his foot on the treadle, so as to remove the trippper out of the path of the latching-levers L, can then cause all the rakes to sweep the grain off the platform in quick succession. In turning the corner of a field of grain, by raising his foot off the treadle, the rakes will roll up, and enable him to carry the grain upon the platform sufficiently far to take it out of the way of the team and machine on the next round.

Where the grain is short, or its condition is such that it is not desirable to bind it, the driver can set the tripping-devices so that the rake-teeth will pass the cutters some distance before turning. This will be found advantageous in harvesting clover or timothy-seed, where but little of the stalk is gathered with the heads, as, by such adjustment of the tripper, a large quantity can be gathered and carried upon the platform, while at the same time the cutters are kept clear, which would not be the case if the teeth were rocked or rolled up at a point directly or nearly over the cutters, as the heads would, in this latter case, fall upon and obstruct the cutters before removed by a succeeding rake.

Another mode of operation is to substitute simply gathering-arms or beaters for some of the rakes, as, for example, two rakes and two beaters may be used, the rakes being controlled in the same way as before, or one of the rakes may be fastened by its button, so as to rake off the grain at each revolution of the revolving rake-head, without attention from the driver, leaving the other to be operated as a rake, or not, as the condition of the crop may require, or both may be fastened by the buttons, and thereby made automatically to rake off the grain.

It will be seen that by means of the improvements herein described, the rake is placed more completely under the control of the driver than it has heretofore been, and can be readily adapted to all the varied conditions and requirements of the different kinds of grain and grass in which it is used.

Having now described my improvements,

What I claim as new, and desire to secure by Letters Patent, is—

1. In a combined rake and reel, the several arms of which may, at the option of the attendant, be made to act either as rake and reel-arms, or as reel-arms only, an adjustable device whereby the rake-teeth may be made to rise out of the grain on the platform, at any desired point in their passage over said platform, without varying the point where said arms enter the grain for reeling it into the cutters.

2. A tripping-device, adapted to release the rake, and permit it to roll up on its longitudinal axis at any desired point in its passage over the platform.

3. A rake, moving over the platform in the arc of a circle, and adapted to turn or roll upon a longitudinal axis, in combination with means for releasing the rake, and causing it to roll up at any desired point, for the purpose set forth.

4. An adjustable tripping-device, operating to release the rake, for permitting its rotation on its longitudinal axis, as described, in combination with means controlled by the driver for moving said tripping-device out of the path of the rake-latch.

5. A button, or equivalent device, for preventing the rake-head from rocking up when released by the tripping-device, whereby any one or all the rakes may be made automatic when desired.

6. The friction-roller, or its equivalent, on the cam-track, for returning the rake to its proper position for gathering and discharging the grain, as set forth.

7. The retracting friction-roller J, or its equivalent, made adjustable, as set forth.

O. WHEELER, JR.

Witnesses:
ROLLIN TRACY,
HENRY B. FITCH.